United States Patent
Fujii et al.

[15] 3,683,057
[45] Aug. 8, 1972

[54] PROCESS FOR THE PRODUCTION OF COMPRESSED SHAPES OF UREA

[72] Inventors: Kenzo Fujii, Kamakura; Kazumichi Kanai, Fugisawa; Shigeru Inoue, Kamakura; Kiyoshi Matsuo, Kamakura; Masami Asakura, Kamakura, all of Japan

[73] Assignee: Mitsui Toatsu Chemicals, Incorporated, Tokyo, Japan

[22] Filed: Jan. 22, 1971

[21] Appl. No.: 109,021

[30] Foreign Application Priority Data

Jan. 22, 1970 Japan ........................45/5382
Sept. 8, 1970 Japan ......................45/78187

[52] U.S. Cl. ..................264/140, 264/118, 264/331
[51] Int. Cl. ..............................................B01j 2/00
[58] Field of Search.....................264/140, 331, 118

[56] References Cited

UNITED STATES PATENTS

| 3,446,877 | 5/1969 | Endler | 264/13 |
| 3,308,212 | 3/1967 | Tsao | 264/13 |
| 3,124,624 | 3/1964 | Berlien et al. | 264/13 |

*Primary Examiner*—Robert F. White
*Assistant Examiner*—J. R. Hall
*Attorney*—Christen & Sabol

[57] ABSTRACT

Crystalline urea is compressed at a temperature of from 50° to 132° C. and below the melting point of the urea and at a pressure of at least 2 kg./cm$^2$ to form urea shapes. In one embodiment, molten urea is added in an amount of from 5 to 50 percent by weight of the crystalline urea.

10 Claims, No Drawings

PROCESS FOR THE PRODUCTION OF COMPRESSED SHAPES OF UREA

The present invention relates to an improved process for the production of urea shapes such as sheets or other suitable forms. More particularly, the present invention relates to an improved process for producing granular urea.

Presently used widely as fertilizer is so-called granular urea which is in the form of pearls having a diameter of about 1.0–2.0 mm. The reason for shaping urea into the form is that crystalline urea tends to cake, since it is small in crystal size and hygroscopic, and the caked urea is extremely hard and difficult to handle for further treatment. Thus, it is necessary to minimize the surface area of the urea thereby preventing absorption of moisture which leads to caking. Among various methods of granulating urea, the so-called prilling method is widely utilized and comprises injecting or dropping molten, substantially anhydrous urea through a nozzle into a granulating tower wherein the molten urea is cooled by contact with a cooling gas such as air.

In addition to the prilling method, known methods include flaking, which comprises cooling molten urea on a cold surface and crushing the solidified urea into flakes, and an oil-cooling method which comprises injecting molten urea into a cooling medium such as a mineral oil. It is not certain, however, whether or not these two methods are being used on an industrial scale. In all of the above methods it is essential that the urea be rendered entirely molten at least once during the procedure. Finally, mechanical granulating methods have been used such as extrusion or tabletting.

Among the above granulating methods, those utilizing urea in the completely molten state i.e. the prilling method, flaking method and oil-cooling method, have several disadvantages. They require steam for converting solid urea into a substantially anhydrous melt and fail to prevent the formation of biuret which results from maintaining urea in the molten state for extended periods. In addition, the prilling method necessitates considerable cost of construction for a granulating tower, and causes environmental pollution due to entrainment of fine pulverized urea particles in the cooling air withdrawn from the tower. In the mechanical granulating methods, pressures as high as several tens of kilograms per square centimeter (gauge) are still insufficient to impart adequate hardness to the shaped granules, as compared with the melt-granulating methods. If substantial hardness is desired for the mechanically shaped urea, the cost of equipment will be prohibitively expensive.

In comparing the prilling method with the mechanical pressure-granulating method, the latter is more desirable from the aspect of utilities requirements but the former is superior with respect to productivity per unit apparatus. This superiority in productivity adapts the prilling method to the general tendency of enlarging urea plants and hence this method is now widely utilized. However, as the urea plants utilizing the air-cooled prilling method become larger, the problem of environmental pollution caused by the cooling air exhausted from the granulating tower has become serious. Taking also into consideration the expense required for counteracting the environmental pollution, the mechanical granulating method is not necessarily found to be disadvantageous but may rather become desirable depending on the apparatus used. The disadvantage of the mechanical granulating method resides, as described above, in the necessity for extremely high pressures. If these high pressures can be lowered, it will follow that the equipment can be simplified and productivity per unit apparatus will increase.

It is therefore a primary object of the present invention to provide a process for producing urea shapes which overcomes the disadvantages of the prior art processes.

It is another object of the present invention to provide a process for producing urea shapes, especially granular urea, having sufficient hardness without permitting the formation of undesirable biuret.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, shaped urea is produced by compressing urea at a temperature of 50°–132° C., and lower than the melting point of the urea, under a pressure of at least 2 kg./cm² (gauge) to shape the urea into a suitable form such as a sheet or substantial sphere. The starting urea may be pre-heated up to the above-mentioned shaping temperature, or the shaping apparatus may be heated so as to heat and maintain the urea at a desired temperature. Alternatively, the starting urea may be mixed with molten urea. Granular area is obtained, for example, by crushing the urea which has been shaped into a sheet according to the above method and collecting particles having desired granule sizes.

Urea utilizable for the invention may be prepared by any desired method. Processes for the manufacture of urea from ammonia and carbon dioxide are old and well known in the art. Basically, these processes involve the reaction of ammonia and carbon dioxide, in molar proportions of 2 to 4 moles of the former to 1 mole of the latter, at temperatures of 130° to 210° C. and pressures of 70 to 300 atmospheres, whereby urea is formed to the extent of 30 to 75 percent of theoretical. Excess ammonia and unreacted ammonia and carbon dioxide are separated from the urea formed, then condensed and recycled to the process. For example, urea is industrially produced by reacting ammonia with carbon dioxide at high pressures and temperatures. This reaction proceeds in accordance with the following formulas:

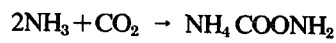
$$2NH_3 + CO_2 \rightarrow NH_4COONH_2$$

$$NH_4COONH_2 \rightarrow NH_2CONH_2 + H_2O$$

More particularly, the urea may be one prepared in a crystalline form by separating unreacted ammonium carbamate from a urea synthesis solution and concentrating the resulting aqueous urea solution, or one in granular form prepared by spray-drying the concentrated solution. The urea may contain water in an amount of less than 5 percent by weight. The granular size of the urea is preferably that which will pass a screen of 20 meshes per inch and be retained on a screen of 60 meshes per inch.

Molten urea to be added to the solid urea may contain water in an amount of less than 5 percent by weight and is maintained at any desired temperature within the range from the melting point of urea, i.e. 132° C., down to 115° C. The amount of molten urea added is 5–50 percent by weight, and preferably 15–35 percent by weight, based on the crystalline urea. If the amount exceeds 50 percent by weight, the process will be substantially equivalent to the prilling method and moreover, the product will not easily be released from the pressure-shaping apparatus. On the other hand, if the amount is less than 5 percent, the shaping pressure will be undesirably elevated.

Mixing of crystalline urea with the molten urea is effected by using any desired type of apparatus which permits homogeneous mixing. For example, the mixture is preferably mixed in a kneader. Mixing of these components may also be effected in a screw-feeder which serves to convey the starting material to a pressure-shaping apparatus. However, care should be taken to prevent the molten urea from solidification during the mixing treatment. Thus, it is necessary, for example, to preheat the crystalline urea to a temperature between 50° C and the melting point of the urea or to heat the mixing apparatus.

The mechanical pressure-shaping conditions are selected so that the temperature and pressure are maintained at 50°–132° C. and lower than the melting point of the urea, and at least 2 kg./cm$^2$ (gauge), respectively. When the temperature is lower than 50° C., a shaped product having sufficient hardness will not be obtained even if the pressure is maintained at 100 kg./cm$^2$ (gauge) or higher. The upper limit of the temperature is determined by the melting point of urea utilized which becomes lower than the melting point of pure urea as the content of water increases. On the other hand, when the pressure is lower than 2 kg./cm$^2$ (gauge), a shaped product having sufficient hardness will not be obtained even if the temperature is elevated to near the melting point of the urea. The upper limit of the pressure is not determined theoretically but only for economical reasons. The hardness of the resulting urea becomes higher as the shaping pressure or temperature becomes higher. When a shaped urea of definite hardness is prepared, the shaping pressure can be lowered as the temperature becomes higher. Preferred shaping conditions involve temperatures of 70°–130° C. and pressures of 5–100 kg./cm$^2$ (gauge). The time required for the compression step is normally shorter than 60 seconds. In any event, the compression time should be sufficient to provide at the selected temperature and pressure, a hardness of at least 0.5 kg. The shaping conditions can be moderated as the water content of the urea increases. Thus, water or an aqueous solution of urea (which may have a temperature of 30° to 140° C. and a urea concentration of 10 to 95 percent by weight) may be sprayed onto the crystalline urea to maintain the water content of the urea at 0.5–5 percent. Alternatively, a high molecular weight substance or a wax, susceptible of fusion or sintering at temperatures of 50°–130° C. in amounts of from 1 to 50 percent by weight of the urea, or an aldehyde capable of reacting with urea, such as formaldehyde, acetaldehyde, isobutyraldehyde or the like in amounts of from 0.001 to 0.05 mol per mol of the urea, may be added. When shaping the urea, an herbicide, insecticide, bactericide, nitration-inhibiting, agent, dye, pigment, etc. may be added thereto. Suitable high molecular weight substances include poly (ethyl methacrylate), atactic polypropylene, AC-polyethylene, polystyrene, polyethylene, polyvinyl alcohol, methylolurea, methylated methylolurea and methylolmelamine, and operable waxes include animal waxes such as beeswax, mineral waxes such as ozecerite and paraffin, and synthetic waxes such as microcrystalline waxes and oxidized microcrystalline waxes.

Preferred apparatus for the shaping treatment include one providing two rolls between which the starting material is passed and one having two rolls which provide on both surfaces semispherical concave depressions arranged in a face-to-face relation. Since the purpose of forming shapes can be attained by compressing the urea under heat, any apparatus providing this function can be used for the present invention. Thus, the apparatus are not limited to those having rolls.

To obtain granular urea according to the present invention, urea mechanically compressed into a sheet having a thickness preferably less than 10 mm., especially 1 to 5 mm., is crushed by the aid of a crusher and granules having a desired particle size, preferably from 1 to 4 mm., are collected. Oversized granules are further crushed and undersized granules are recycled to the shaping treatment. If necessary, the crushed granules may be subjected to a mechanical treatment or dropped in heated air to effect superficial fusion, thereby rounding off the edges of the crushed granules.

This invention which contemplates the shaping of urea by compressing it at an elevated temperature is not to be considered merely a combination of mechanical pressure at normal temperatures and a method wherein the urea is rendered entirely molten, both having been known heretofore. The heating conditions of the present invention are of great significance. It is generally considered that water contained in urea crystals is not dispersed uniformly into the crystal but exists in a relatively moist state on the crystal surface. Thus, the melting point of the moist surface area is lower than that of the central portion of the crystal and the urea crystal begins to melt in this area without the necessity of heating to an extremely elevated temperature. On the other hand, urea crystals have a thin needle form. As the spaces between individual crystals can be regarded as continuous capillaries, the melt formed by fusion promptly penetrates the capillaries. The compression treatment in such a state facilitates penetration of the melt and causes a bridging effect which is neither taught nor suggested by the prior art and is surprising. On the other hand, some water is evaporated by the initial heating as well as by the heat of compression and thus serves to enhance the strength of the product after shaping. The synergistic coaction of the peripheral fusion caused by heating and the bridging effect based on penetration of the melt by pressure is considered to be effective to produce a firm product. If either one of these operations, for example, compression alone is applied, penetration of the melt will not occur and an extremely high pressure will be needed to expect any bridging effect resulting from the small amount of water carried by the urea crystals. On the other hand, application of the heating operation alone makes it difficult to achieve easy penetration of the melt and eventually is similar to completely melting the crystals as in the prior art. Consequently, a firm product will not be obtained and moreover a problem will arise in connection with cooling.

In practicing the present invention, a number of technical advantages are obtained. First, fusion or sintering of only a portion of the urea is sufficient to attain the binding effect for the urea crystals and thus the amount of heat necessary for shaping is extremely small as compared with the prior art complete melting method. Secondly, since the amount of heat required for shaping is small, the amount of heat to be later removed is also small. This makes it unnecessary to use a large-scale cooling tower as in the prilling method, thus economizing the cost of equipment and preventing various troubles incidental to the operation of such cooling towers. Thirdly, the heating time is short and the heating temperatures are low as compared with the complete melting method. Therefore, the formation of biuret is substantially prevented. Furthermore, said shorter heating time and lower heating temperatures make it appropriate to shape or granulate urea incorporated into an agricultural agent or other product easily susceptible to decomposition at high temperatures. Even when a high molecular weight compound having a low melting point such as a wax is incorporated into the urea to effect prevention of moisture or to control dissolution of the urea, the formation of two phases as occur in the complete melting method is avoided, thus facilitating the operation. In addition, the mechanical pressure-shaping method requires pressures as high as several hundreds of kilograms per square centimeter, while the process of this invention requires pressures of at most several tens of kilograms per square centimeter by selecting an appropriate shaping temperature. Finally, addition of molten urea to crystalline urea overcomes disadvantages arising from using a pressure-shaping apparatus with rolls. When crystalline urea alone is used as the starting material in said apparatus, so-called "escape" takes place and the crystalline urea cannot be evenly supplied, resulting in discontinuous formation of the product and deterioration of the quality thereof.

This invention will be illustrated more in detail by the following examples wherein all parts and percentages are by weight.

EXAMPLE 1

40 gram samples of crystalline urea containing 0.2 percent by weight of water and 0.1 percent by weight of biuret were charged into a metal mold maintained at the molding temperatures shown in Table 1, allowed to stand for 3 minutes and then pressed under the pressures shown in Table 1 for 15 seconds to form sheets having a thickness of about 2 mm. Test pieces in the form of triangles having sides measuring about 5 mm., were prepared from each sheet and subjected to a hardness test using a scleometer made by the Kiya Manufacturing Co., the results being shown in Table 1. The results of the test show values measured in kg. which indicate the load necessary to destroy the test piece. The biuret content was concurrently measured for each sheet, the results also being shown in Table 1.

TABLE 1

| Molding pressure (kg/cm² gauge) | Hardness (kg) and Biuret (% by wt) | Molding Temperature (°C.) | | | | |
|---|---|---|---|---|---|---|
| | | 40 | 50 | 80 | 100 | 120 |
| 5 | Hardness | Not moldable | barely moldable | barely moldable | 0.3 | 0.3 |
| | Biuret | — | — | — | 0.105 | 0.11 |
| 10 | Hardness | not moldable | barely moldable | 0.1 | 0.5 | 0.8 |
| | Biuret | — | — | 0.1 | 0.105 | 0.11 |
| 30 | Hardness | not moldable | barely moldable | 0.2 | 1.1 | 3.6 |
| | Biuret | — | — | 0.1 | 0.105 | 0.11 |
| 50 | Hardness | not moldable | barely moldable | 0.4 | 1.5 | 3.8 |
| | Biuret | — | — | 0.1 | 0.105 | 0.11 |
| 80 | Hardness | not moldable | 0.1 | 1.3 | 2.3 | 4.1 |
| | Biuret | — | 0.1 | 0.1 | 0.105 | 0.11 |
| 100 | Hardness | 0.2 | 0.8 | 1.9 | 4.0 | 4.3 |
| | Biuret | 0.1 | 0.1 | 0.1 | 0.105 | 0.11 |

EXAMPLE 2

100 grams samples of crystalline urea containing 0.2 percent moisture and 0.1 percent biuret and preheated to 130°C., and 100 gram samples of a homogeneous mixture of the crystalline urea with 20 percent by weight based on the crystalline urea of molten urea having a temperature of 140° C. and containing 0.2 percent moisture and 0.3 percent biuret, were compressed into sheets at various pressures using the mold of Example 1. The time required for shaping in each instance was 1 second. The sheets were cooled to 50° C. and crushed. Test pieces having an average diameter of 3–5 mm. were subjected to the hardness test of Example 1 and biuret content was measured. The results are shown in Table 2.

TABLE 2

| Molding pressure (kg/cm²) | Hardness of the Molded pieces (kg.) | |
|---|---|---|
| | Without molten urea | With molten urea |
| 20 | 0.53 | 2.0 |
| 40 | 1.2 | 3.7 |
| 60 | 1.9 | 4.5 |
| 90 | 2.9 | 5.0 |
| 135 | 3.5 | 5.0 |
| Biuret (%)* | 0.12 | 0.15 |

*The biuret was constant irrespective of differences in molding pressure.

As is evident from the results shown in Table 2, addition of molten urea provides molded pieces having higher hardness values than those obtained at the same pressure without addition of molten urea.

EXAMPLE 3

Two rolls positioned to face each other and having a diameter of 12.5 cm. and a length of 20 cm. were rotated each in an opposite direction at a velocity of 7 r.p.m. Crystalline urea heated to 110° C. and containing 0.5 percent by weight of water and 0.1 percent by weight of biuret was fed at a rate of 1,650 grams per minute into the space between the rolls and molded under a pressure of 50 kg./cm$^2$ (gauge) into a sheet. During the operation, the rolls were maintained at 110° C. and the time required for molding was 0.2 second. The resulting urea sheet was crushed by a crusher and granules having a size of 5–16 mesh were collected. Oversize fragments were further crushed and granules of said sizes were collected. The granules of 5–16 mesh amounted to 73 percent by weight of the urea sheet. Undersize fragments were recycled to the molding treatment.

The resulting granules had a hardness of 3.0 kg. and contained 0.107 percent by weight of biuret.

By comparison, granules obtained by melting said starting material at 140° C., dropping the melt from a nozzle and cooling the drops in air had a hardness of 0.5 kg. and contained 0.40 percent by weight of biuret.

EXAMPLE 4

Crystalline urea containing 0.2 percent moisture and 0.1 percent biuret and preheated to 120° C. was homogeneously mixed in a screw-feeder with molten urea (140° C., 0.2 percent moisture, and 0.3 percent biuret) in an amount of 50 percent by weight based on the crystalline urea. The mixture was continuously fed, while the molten urea remained molten (not solidified), to the apparatus described in Example 3. The pressure between the rolls and the temperature thereof were 10 kg./cm$^2$ and ambient temperature, respectively, and the thickness of the pressed sheet was 1.5 mm. Feed of the mixture into the space between the rolls was good. Five test pieces were taken from the pressed sheet continuously formed and subjected to the hardness test of Example 1, giving the following results: 2.7, 2.7, 2.6, 2.4 and 2.0 kg. (average 2.5 kg.). The biuret content was 0.1 percent.

EXAMPLE 5

Crystalline urea was sprayed with 37 percent (wt.) formalin in an amount of 0.01 mol per mol of urea. Test pieces of the sprayed urea were prepared using the apparatus and procedure of Example 3. The compression temperature was 80° C. and a pressure of 70 kg./cm$^2$ (gauge) was used. The resulting granules of 5–16 mesh amounted to 80 percent by weight of the compressed sheet and had a hardness of 3.2 kg.

EXAMPLE 6

Crystalline urea was admixed with 10 percent by weight of a pulverized paraffin wax and the mixture was compressed and then crushed in a manner similar to that of Example 3 to obtain granules having their surface coated with the wax. The shaping temperature and pressure were 70° C. and 100 kg./cm$^2$, respectively. The resulting granules of 5–16 mesh amounted to 65 percent by weight of the compressed sheet and had a hardness of 2.5 kg.

Shaped urea obtained in the form of blocks or spheres of any suitable size according to the process of the present invention have smooth surface characteristics and are dense even in the inner portions, thus making it useful to employ the urea as fertilizer, for example, for fertilizing seaweed.

What is claimed is:

1. A process for the production of compressed shapes of urea which comprises compressing crystalline urea at a temperature of from 50° to 132° C. and below the melting point of said urea under a pressure of at least 2 kg/cm$^2$ gauge to form said compressed shapes.

2. The process according to claim 1 wherein said crystalline urea contains water in an amount less than 5 percent by weight.

3. The process according to claim 1 wherein said crystalline urea is preheated to said temperature prior to compressing.

4. The process according to claim 1 further comprising adding to said crystalline urea from 5 to 50 percent by weight based on said crystalline urea of molten urea containing water in an amount less than 5 percent by weight and having a temperature of from 115° to 132°, and mixing and compressing said crystalline urea and said molten urea while keeping the molten urea in the molten state.

5. The process according to claim 1 wherein the crystalline urea is compressed at a temperature of from 70° to 130° C. and at a pressure of from 5 to 100 kg/cm$^2$ gauge.

6. The process according to claim 1 wherein a member selected from the group consisting of water and an aqueous urea solution is added to said crystalline urea to provide a water content thereof between 0.5 and 5 percent by weight.

7. The process according to claim 1 comprising compressing said crystalline urea into a sheet having a thickness of less than 10 mm., crushing the sheet to form granules and collecting granules having a predetermined size.

8. The process according to claim 7 wherein granules of 5–16 mesh are collected.

9. The process according to claim 1 wherein from 1 to 50 percent by weight based on the urea of a high molecular weight substance selected from the group consisting of poly (ethyl methacrylate), atactic polypropylene, polystyrene, polyethylene, polyvinyl alcohol, methylolurea, methylated methylolurea, methylolmelamine and a wax is added to said crystalline urea.

10. The process according to claim 1 wherein an aldehyde which reacts with urea is added to said crystalline urea in an amount of from 0.001 to 0.05 mol per mol of urea.

* * * * *